United States Patent
Kim et al.

(10) Patent No.: US 7,939,217 B2
(45) Date of Patent: May 10, 2011

(54) DIRECT METHANOL FUEL CELL

(75) Inventors: Joon-hee Kim, Seongnam-si (KR); Kyoung-hwan Choi, Suwon-si (KR); Sang-kyun Kang, Seoul (KR); Jin-ho Kim, Seoul (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 903 days.

(21) Appl. No.: 11/839,110

(22) Filed: Aug. 15, 2007

(65) Prior Publication Data

US 2008/0160385 A1    Jul. 3, 2008

(30) Foreign Application Priority Data

Dec. 28, 2006    (KR) .................. 10-2006-0136824

(51) Int. Cl.
*H01M 8/22*    (2006.01)
*H01M 2/38*    (2006.01)
*H01M 8/04*    (2006.01)

(52) U.S. Cl. ......... 429/506; 429/462; 429/513; 429/515
(58) Field of Classification Search .................. 429/462, 429/506, 513, 515
See application file for complete search history.

(56) References Cited

U.S. PATENT DOCUMENTS

| | | | |
|---|---|---|---|
| 6,811,905 B1 * | 11/2004 | Cropley et al. | 429/13 |
| 2003/0198853 A1 * | 10/2003 | Choi et al. | 429/32 |
| 2005/0170224 A1 * | 8/2005 | Ren et al. | 429/15 |

* cited by examiner

*Primary Examiner* — Helen O Conley
*(74) Attorney, Agent, or Firm* — Lee & Morse, P.C.

(57) ABSTRACT

A direct methanol fuel cell (DMFC) comprising: a membrane electrode assembly (MEA) including an anode, a cathode, and a membrane disposed therebetween; a spacer surrounding the anode, having supply holes to supply methanol to the anode; and a flow control member to control the supply of the methanol. The flow control member includes a porous support and/or a methanol transmissive layer. The methanol transmissive layer comprises a fluorine polymer, a hydrocarbon polymer, or a combination thereof.

20 Claims, 3 Drawing Sheets

DIRECT METHANOL FUEL CELL

CROSS-REFERENCE TO RELATED APPLICATION

This application claims the benefit of Korean Application No. 2006-136824, filed Dec. 28, 2006 in the Korean Intellectual Property Office, the disclosure of which is incorporated herein by reference.

BACKGROUND OF THE INVENTION

1. Field of the Invention

Aspects of the present invention relate to a direct methanol fuel cell (DMFC).

2. Description of the Related Art

In general, fuel cells are electricity generators that convert the chemical energy of a fuel into electrical energy through a chemical reaction and can keep generating electricity as long as the fuel is supplied thereto. Among fuel cells, a direct methanol fuel cell (DMFC) generates electricity by supplying an anode with methanol and reacting protons from the methanol with oxygen supplied to a cathode. A DMFC usually has a cell structure as illustrated in FIG. 1.

Referring to FIG. 1, an anode 11 and a cathode 13 are disposed facing each other, and an electrolyte membrane 12 is disposed between the anode 11 and cathode 13. The cathode 13 is exposed to external air, which is used as an oxygen source. The anode 11 is surrounded by a spacer 14, and vaporized methanol is supplied to the anode 11 through supply holes 14a formed in the spacer 14. In the anode 11, a reaction as defined by Formula 1 below occurs, and thus, electrons are generated. The electrons move to the cathode 13 along a path 15 and participate in a reaction defined by Formula 2 below.

$$CH_3OH+H_2O \leftrightarrow CO_2+6H^++6e^- \qquad <\text{Formula 1}>$$

$$3/2O_2+6H^++6e^- \leftrightarrow 3H_2O \qquad <\text{Formula 2}>$$

As such, work can be done by using the generated electrons, when a load 16 is disposed in the path 15. An assembly of the anode 11, the cathode 13, and the electrolyte membrane 12 is conventionally called a membrane electrode assembly (MEA) 10.

Methods of supplying methanol to the anode 11 include a method of supplying methanol in a liquid state using a pump, and a method of guiding vaporized methanol to the anode 11, using the natural vaporization of methanol at room temperature. The latter method is called a passive method, and the associated structure is referred to as a passive DMFC.

When supplying the vaporized methanol to the anode 11, through the supply holes 14a of the spacer 14, it is difficult to control the amount of supplied vaporized methanol. After starting to supply the vaporized methanol, the vaporized methanol continues to flow through the supply holes 14a of the spacer 14. If the amount of supplied vaporized methanol is excessive, a combustion reaction of methanol, due to a cross-over/penetration phenomenon (crossover) of the vaporized methanol into the cathode 13, frequently occurs, and the DMFC can become overheated. Hence, if the methanol floods the MEA, the crossover can occur. Crossover generally refers to when methanol penetrates the electrolyte membrane 12 and crosses over to the cathode 13. The methanol crosses over to the cathode 13 and reacts with oxygen and combusts, and thereby sharply increases the temperature of the DMFC.

Conventionally, the spacer 14 is relatively thick, in order to increase a distance D between the exits of the supply holes 14a and the anode 11, to prevent methanol from flooding the anode 11. Therefore, the excessive supply of fuel to the anode 11 is prevented, because the concentration of the vaporized methanol gradually decreases, as the distance from the exits of the supply holes 14a to the anode 11 increases.

However, the thickness of the spacer 14 increases the volume of a unit cell of a DMFC and increases the total size the DMFC. Hence, according to the conventional structure, the distance D is increased, in order to prevent flooding, resulting in the DMFC having a relatively large size.

A device that can appropriately control the excessive fuel supply, without employing a thick spacer, would be beneficial in reducing the overall size of a DMFC.

SUMMARY OF THE INVENTION

Aspects of the present invention provide a direct methanol fuel cell (DMFC) having an improved structure for supplying fuel, wherein an excessive fuel supply (flooding) can be prevented, without increasing the size of the DMFC.

According to aspects of the present invention, there is provided a direct methanol fuel cell (DMFC) comprising: a membrane electrode assembly (MEA), in which an anode, an electrolyte membrane, and a cathode are disposed; a spacer surrounding the anode, having supply holes through which methanol flows; and a flow control member, which is disposed between the supply holes and the anode, to restrict the flow of the methanol from the supply holes to the anode.

According to an aspect of the invention, the flow control member can be formed by a porous substrate and a methanol transmissive layer disposed thereon.

According to an aspect of the invention, the porous substrate can be a porous ceramic, and the methanol transmissive layer can be selected from a fluorine polymer, a hydrocarbon polymer, or a combination thereof.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
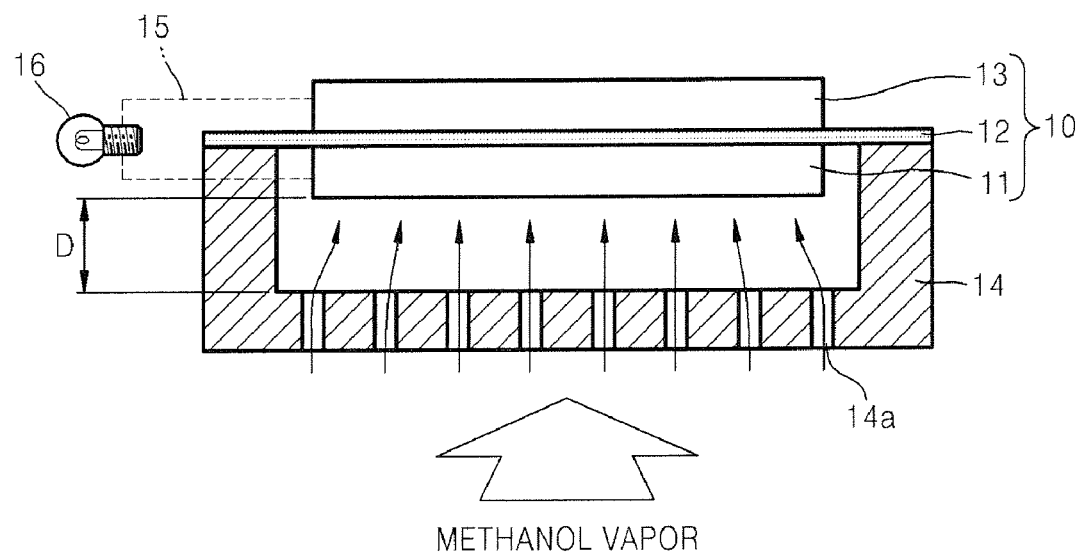
FIG. 1 illustrates a cell structure of a conventional direct methanol fuel cell (DMFC)

Reference will now be made in detail to the exemplary embodiments of the present invention, examples of which are illustrated in the accompanying drawings, wherein like reference numerals refer to the like elements throughout. The embodiments are described below in order to explain the present invention by referring to the figures.

Figure 2:
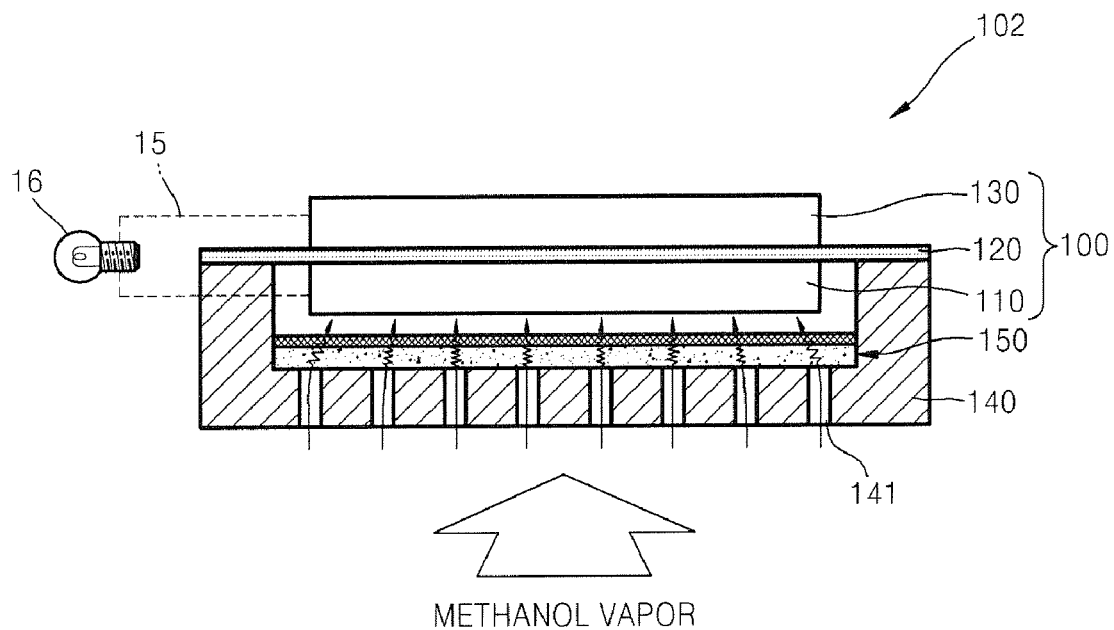
FIG. 2 illustrates a cell structure of a DMFC, according to an exemplary embodiment of the present invention.

FIG. 2 illustrates a cell structure of a direct methanol fuel cell (DMFC) 102, according to an exemplary embodiment of the present invention. The DMFC 102 includes a membrane electrode assembly (MEA) 100. The MEA 100 includes an anode 110, an electrolytic membrane 120, a cathode 130, and a spacer 140 surrounding the anode 110. Protons from methanol, which is supplied to the anode 110 through supply holes 141 of the spacer 140, react chemically with oxygen supplied to the cathode 130 from external air, to generate electricity.

A flow control member 150, to control a flow of the methanol, is disposed between the spacer 140 and the anode 110. Therefore, the flow of the methanol, in the form of methanol vapor, from the supply holes 141 to the anode 110, is restricted by a permeation of the methanol through the flow control member 150. The flow control member 150 is used to control an amount of the methanol that is supplied to the anode 110, while minimizing a distance between the supply holes 141 and the anode 110.

Figure 3:
FIG. 3 illustrates a flow control member having the cell structure of the DMFC of FIG. 2, according to an exemplary embodiment of the present invention.

The flow control member 150 can be formed, for example, as illustrated in FIG. 3, by coating, or otherwise disposing, a methanol transmissive layer 152 on a porous substrate 151. The methanol transmissive layer 152 can be a membrane that allows methanol to flow and/or diffuse there through. The methanol transmissive layer 152 can comprise an ionomer, for example a fluorinated polymer. The fluorinated polymer can be a sulfonated tetrafluorethylene copolymer, for example, a NAFION ionomer. The NAFION ionomer can be any NAFION formulation that allows a significant amount of methanol to flow and/or diffuse there through, while at the same time imparting a sufficient level of impedance to the flow rate of the methanol, to prevent the DMFC 102 from being flooded by the methanol. Any hydrocarbon polymer that has the same effect as the NAFION ionomer can also be used in the methanol transmissive layer 152. The methanol transmissive layer can comprise a combination of a fluorinated polymer and a hydrocarbon polymer.

The methanol transmissive layer 152 can be coated on the substrate 151. The methanol transmissive layer 152 can be sprayed onto the porous substrate 151. The thickness of the methanol transmissive layer 152 can be controlled by varying an amount of a transmissive solution, which forms the methanol transmissive layer 152, that is applied to the porous substrate 151. The transmissive solution can be treated, for example, heat treated, to form the transmissive layer 152. Further, the solution can be infused into the porous substrate 151, such that a distinct layer 152 is not formed.

The flow rate, of methanol through the transmissive layer 152, can be varied by varying the thickness of the methanol transmissive layer 152. The thickness of the transmissive layer can be increased, in order to reduce the flow rate (i.e., the amount of transmitted methanol), and the thickness can be decreased, to increase the flow rate.

The porous substrate 151 may be a hard porous ceramic material. The porous substrate can be any material that is suitable to support a flexible membrane member, such as, an electrolyte membrane, while still allowing methanol to flow there through. Such membranes tend to expand and/or contract, resulting in a distortion thereof and associated changes in permeability.

When the flow control member 150 is disposed between the spacer 140 and the anode 110. The methanol flows through the supply holes 141, through the porous substrate 151, and finally through the methanol transmissive layer 152. Accordingly, the flow of the methanol is restricted, and the flow of the methanol, through the flow control member 150 to the anode 110, is thereby reduced. Therefore, the supply of methanol can be appropriately controlled, while minimizing a distance between the supply holes 141 and the anode 110, resulting in the DMFC 102 being relatively compact.

The porous substrate 151 can be used without the transmissive layer 152, to restrict the flow of methanol. However, in this case, the thickness of the porous substrate 151 may need to be increased to adequately control the flow of methanol. According to an experiment, coating 1 mg/cm$^2$ of the methanol transmissive solution on the porous substrate 151 having a thickness of 3 mm, to form the transmissive layer 152 on the porous substrate 151, has almost the same effect as increasing the thickness of the porous substrate 151 by an additional 0.5 mm. However, increasing the thickness of the porous substrate 151 by 0.5 mm in a cell structure of DMFC 102 can be an obstacle to making the DMFC 102 compact. In other words to achieve the same flow rate, a greater thickness of the porous substrate 151 alone, may be needed, in comparison to the porous substrate 151 used in combination with the transmissive layer 152. Thus, for overall compactness, the porous substrate 151 may be used in combination with the methanol transmissive layer 152.

Figure 4A:
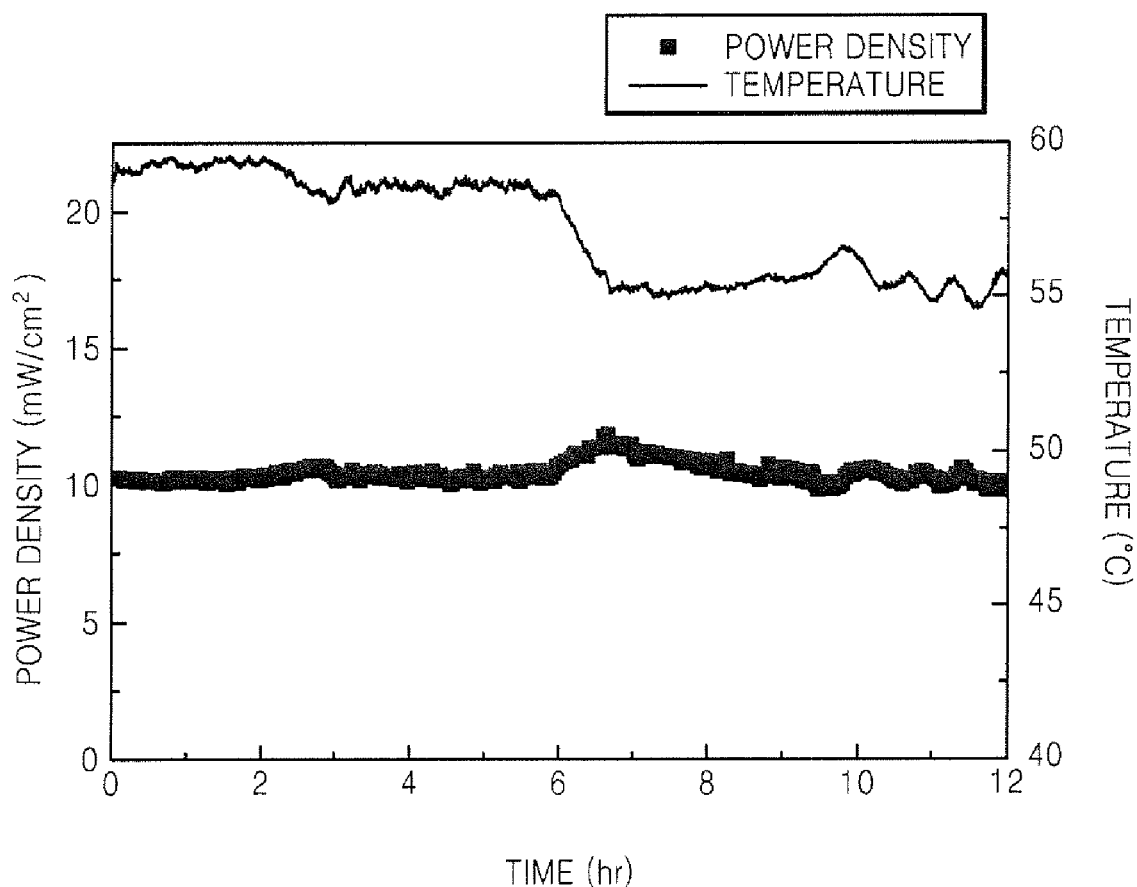
FIGS. 4A and 4B are graphs respectively illustrating a power density of a first DMFC having a porous substrate as a flow control member, and a second DMFC having a porous substrate coated with a methanol transmissive layer as a flow control member, according to exemplary embodiments of the present invention.
Figure 4B:
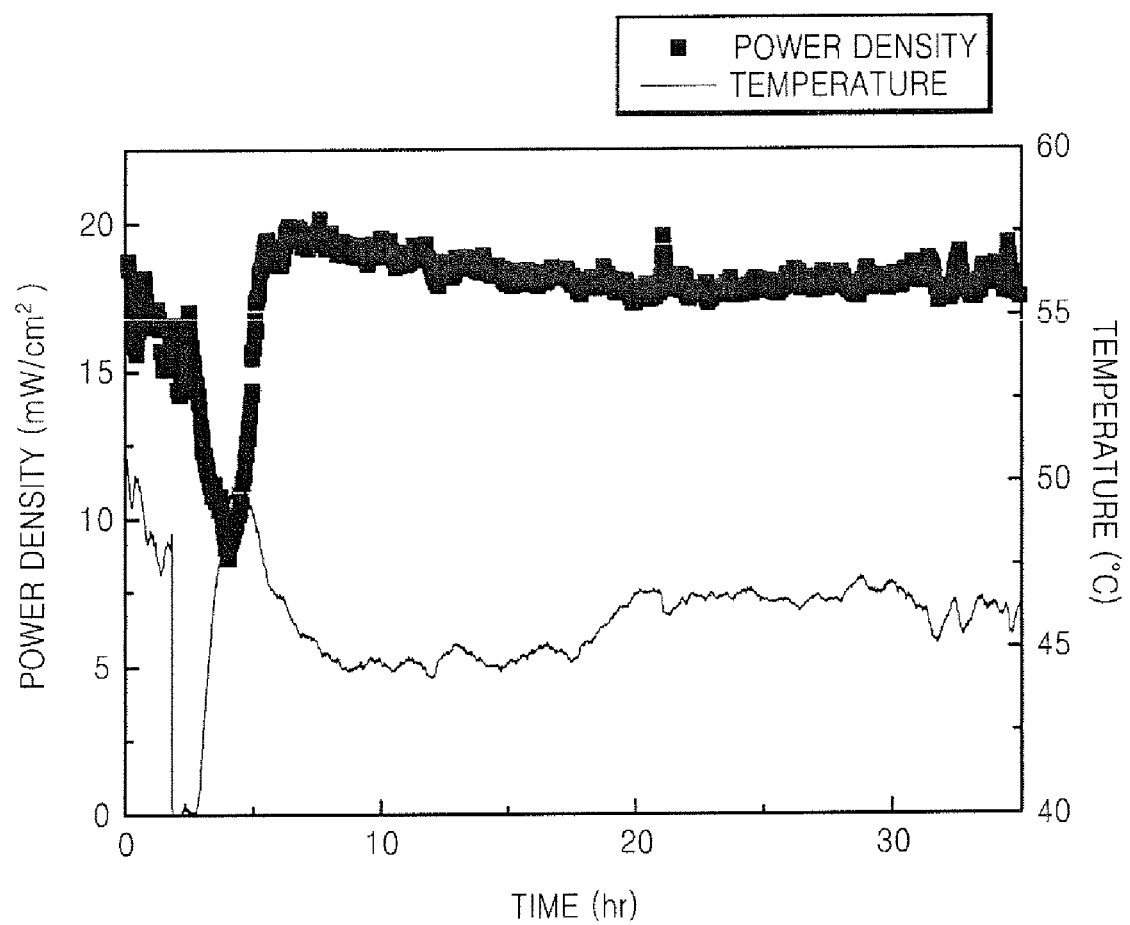

FIGS. 4A and 4B are graphs illustrating respective power densities and operating temperatures of a first DMFC, which includes the porous substrate 151 without the methanol transmissive layer 152, and a second DMFC, which includes the porous substrate 151 and the methanol transmissive layer 152. Referring FIG. 4A, the first DMFC has a relatively low power density. In addition, the operating temperature of the first DMFC is relatively high.

Referring to FIG. 4B, the second DMFC is shown to have about twice the power density of, and about half the operating temperature of, the first DMFC. The second DMFC is stabilized, due to a reduction in methanol cross-over. These results show that most of methanol that is supplied to the second DMFC is stably consumed, to generate electricity instead of heat.

When the power densities and the operating temperatures of the first DMFC and the second DMFC are compared, the relative differences are greater than when compared to a conventional DMFC, where nothing is installed between the supply holes 141 and the anode 110.

As described above, the DMFC, according to aspects of the present invention, may have one or more of the following characteristics. First, a cross-over phenomenon, due to an excessive fuel supply (flooding of the anode), can be effectively prevented, without increasing a distance between supply holes of a spacer and an anode, as done in the conventional structure. Also, a more compact DMFC is achieved, because the distance between a spacer and an anode is reduced. Third, methanol flooding of an MEA of the DMFC can be prevented, without increasing the size of the DMFC, by using the flow control member 150. As referred to herein, "disposed upon" can refer to being disposed directly upon or indirectly upon an element. For example, if a first element is said to be disposed upon a second element, the first and second elements can be in direct contact with one another, or one or more intervening elements can be present therebetween.

Although a few exemplary embodiments of the present invention have been shown and described, it would be appreciated by those skilled in the art that changes may be made in the exemplary embodiments, without departing from the principles and spirit of the invention, the scope of which is defined in the claims and their equivalents.

What is claimed is:

1. A direct methanol fuel cell (DMFC) comprising:

a membrane electrode assembly (MEA) comprising an anode, a cathode, and an electrolyte membrane disposed between the anode and the cathode;

a spacer disposed surrounding a lower surface and lateral sides of the anode and having supply holes through which methanol flows; and a flow control member disposed between the supply holes and the anode, through which the methanol flows, to control the flow of methanol to the MEA, and the flow control member being spaced apart from the lower surface of the anode by an area defined by sidewalls of the spacer.

2. The DMFC of claim 1, wherein the flow control member comprises a porous substrate and a methanol transmissive layer disposed on the porous substrate, the porous substrate and the methanol transmissive layer being surrounded by the sidewalls of the spacer.

3. The DMFC of claim 2, wherein the porous substrate is a porous ceramic.

4. The DMFC of claim 2, wherein the methanol transmissive layer is selected from a fluorine polymer, a hydrocarbon polymer, and a combination thereof.

5. The DMFC of claim 2, wherein the porous substrate is disposed to cover the supply holes, and the methanol transmissive layer is disposed to cover the porous substrate.

6. The DMFC of claim 2, wherein the methanol transmissive layer comprises an ionomer.

7. The DMFC of claim 2, wherein the methanol transmissive layer comprises a NAFION copolymer.

8. The DMFC of claim 2, wherein the methanol transmissive layer comprises a NAFION copolymer and the porous substrate comprises flexible electrolytic membrane.

9. The DMFC of claim 1, wherein the flow control member is configured to control the flow of methanol by passive diffusion of the methanol there-through, and to control the flow of methanol to the area defined by the sidewalls of the spacer and the lower surface of the anode.

10. The DMFC of claim 9, wherein the methanol is in the form of methanol vapor.

11. The DMFC of claim 1, wherein the flow control member comprises a porous substrate.

12. A direct methanol fuel cell (DMFC) comprising:

a membrane electrode assembly (MEA) comprising an anode, a cathode, and an electrolyte membrane disposed between the anode and the cathode;

a spacer disposed surrounding a lower surface and lateral sides of the anode and having supply holes through which methanol flows; and a flow control member disposed between the supply holes and the anode, the flow control member being spaced apart from the lower surface of the anode by an area defined by sidewalls of the spacer, and the flow control member including a porous substrate and a methanol transmissive layer disposed on the porous substrate, to impede a flow of methanol from the supply holes to the MEA, through passive diffusion.

13. The DMFC of claim 12, wherein the methanol transmissive layer is selected from a fluorine polymer, a hydrocarbon polymer, and a combination thereof.

14. The DMFC of claim 12, wherein the methanol transmissive layer comprises a NAFION copolymer and the porous substrate comprises a flexible electrolytic membrane.

15. The DMFC of claim 12, wherein the sidewalls of the spacer directly contact the flow control member, and the sidewalls are spaced apart from the respective lateral sides of the anode.

16. The DMFC of claim 12, wherein a first surface of the porous substrate is disposed upon the supply holes and the methanol transmissive layer is disposed upon a second surface of the porous substrate, which opposes the first surface of the porous substrate.

17. The DMFC of claim 16, wherein the methanol transmissive layer is spaced apart from the anode by the area defined by sidewalls of the spacer.

18. The DMFC of claim 12, the porous substrate and the methanol transmissive layer are surrounded by the sidewalls of the spacer.

19. The DMFC of claim 1, wherein the sidewalls of the spacer directly contact the flow control member, and the sidewalls are spaced apart from the respective lateral sides of the anode.

20. The DMFC of claim 1, wherein the flow control member comprises a porous substrate disposed directly on the supply holes and a methanol transmissive solution infused into the porous substrate.

* * * * *